(12) United States Patent
Rastegar

(10) Patent No.: US 10,787,140 B2
(45) Date of Patent: Sep. 29, 2020

(54) DEPLOYABLE AND SMART CAR BUMPER

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 16/105,959

(22) Filed: Aug. 20, 2018

(65) Prior Publication Data

US 2019/0054877 A1 Feb. 21, 2019

Related U.S. Application Data

(60) Provisional application No. 62/548,366, filed on Aug. 21, 2017.

(51) Int. Cl.
*B60R 19/40* (2006.01)
*B60R 19/02* (2006.01)
*B60R 21/0134* (2006.01)

(52) U.S. Cl.
CPC ............ *B60R 19/40* (2013.01); *B60R 19/023* (2013.01); *B60R 21/0134* (2013.01)

(58) Field of Classification Search
CPC ....... B60R 19/40; B60R 19/38; B60R 19/023; B60R 21/0134
USPC ....................................................... 293/118
See application file for complete search history.

(56) References Cited

U.S. PATENT DOCUMENTS

| | | | | |
|---|---|---|---|---|
| 4,514,002 A | * | 4/1985 | McIntosh | B60R 19/56 293/118 |
| 5,033,569 A | * | 7/1991 | Hayes | B60R 19/205 180/169 |
| 6,224,120 B1 | * | 5/2001 | Eipper | B60R 19/40 293/115 |
| 6,942,261 B2 | * | 9/2005 | Larsen | B60R 19/32 180/274 |
| 7,909,373 B2 | * | 3/2011 | Donovan | B60R 19/40 293/118 |
| 8,113,555 B2 | * | 2/2012 | Faruque | B60R 19/28 293/118 |
| 8,246,091 B1 | * | 8/2012 | Jayasuriya | B60R 19/36 180/274 |
| 8,813,897 B2 | * | 8/2014 | Kim | B60R 19/38 180/274 |
| 8,950,800 B1 | * | 2/2015 | Farooq | B60R 21/34 296/187.04 |
| 2005/0082851 A1 | * | 4/2005 | Nakanishi | B60R 19/40 293/118 |

* cited by examiner

*Primary Examiner* — Pinel E Romain

(57) ABSTRACT

A system for protecting an automobile from a collision. The system including: a bumper having one or more bumper segments disposed on the automobile for absorbing at least some energy of the collision; and one or more actuators for deploying the bumper when conditions indicative of an impending collision is detected; wherein the one or more actuators comprise: one or more hydraulic actuators; one or more pneumatic actuators; one or more actuators actuated by one or more detonation charges; one or more fluid-filled bellows; one or more compressively pre-loaded springs; and one or more actuators connected to rotatable joints of links in a linkage.

7 Claims, 13 Drawing Sheets

1
DEPLOYABLE AND SMART CAR BUMPER

CROSS-REFERENCE TO RELATED APPLICATIONS

This application claims the benefit of U.S. Provisional Application No. 62/548,368 filed on Aug. 21, 2018, the entire contents of which is incorporated herein by reference.

This application is a continuation-in-part of U.S. application Ser. No. 14/991,973, filed on Jan. 10, 2016, the entire contents of which is incorporated herein by reference.

BACKGROUND

1. Field

The present invention relates generally to vehicle bumpers, and more particularly to vehicle bumpers that are deployable when potential collision with an object is detected by the vehicle sensors to significantly increase the range of bumper deformation upon impact, thereby significantly reduce impact induced impulsive forces and increase energy absorption, thereby minimize passenger injury and damage to the vehicle.

2. Prior Art

Bumpers are used in motor vehicles to absorb low level impact forces and to limit the amount of damage sustained to the vehicle body during high level impacts. To increase the effectiveness of bumper systems in vehicles in terms of reducing impact induced forces and increasing the level of absorbed impact energy, the size of the bumper in the outward direction (outward projection) has to be increased to reduce the level of impact induced impulsive forces by spreading the force over longer durations, i.e., to allow for larger deformation of the bumper in the direction of the applied impact force. To achieve this objective, many of the known bumper systems have been developed—but with undesirably large protruding sections and appearance that has prevented their consumer acceptance.

Conventional design practice is to provide a bumper system as a single beam-like structure, which when impacted, absorbs energy through plastic deformation. This arrangement of a simple beam-like structure, however, provides an inefficient energy absorbing system and hence the bumper systems are conventionally provided with separate energy absorbers such as struts, springs or foam members which are integrated into the beam-like structure system.

To ensure that such conventional designs can undergo large enough deformation in the direction of impact, the bumper system must extend far enough from the vehicle—both from the front and rear of the vehicle. The extended bumpers would significantly increase the total length of the vehicle, which is highly undesirable from esthetic as well as practical points of views.

A need therefore exists for bumpers for the front and/or rear of vehicles that normally extend nearly the same amount as currently used bumpers, but upon vehicle sensing of a possible collision with an object, would deploy further outward together with its shock absorbing and energy dissipating components to significantly increase the bumper range of deformation and/or travel with the goal of achieving a significant reduction in the peak impact force levels and a significant increase in the bumper system impact energy absorption.

SUMMARY

One object is to provide methods to design deployable bumpers for front and/or rear of vehicles that are deployed when the vehicle sensors detect objects with which the vehicle is about to collide and deployable bumper design embodiments for integration into vehicles.

Many current vehicles already have sensory devices for detecting objects in front, back and sometimes on the side of the vehicle and alert the driver or automatically take appropriate evasive or braking actions. Such sensors are mostly based on Radio Frequency (RF), Radar, or optical (laser) or camera or a combination of thereof. Such sensors that can detect object in collision course with the vehicle in front and rear as well as the sides of a vehicle are well known in the art. It is also expected that most vehicles will be equipped with such sensors in the near future. Such sensors can provide information as to the distance, velocity and when desired, the acceleration of the vehicle relative to the objects in near real time. In addition, since the vehicle velocity is known at all times to the commonly used vehicle microprocessor (computer) based control unit, the control unit can also determine the velocity and acceleration of the object if it is also in motion. The sensor provided distance, velocity and/or acceleration information is used for the operation of the different deployable bumper system embodiments.

BRIEF DESCRIPTION OF THE DRAWINGS

These and other features, aspects, and advantages of the apparatus of the present invention will become better understood with regard to the following description, appended claims, and accompanying drawings where:

FIG. 1 illustrates a schematic of the first embodiment of a deployable bumper for vehicles and the like.

DETAILED DESCRIPTION

Figure 1:
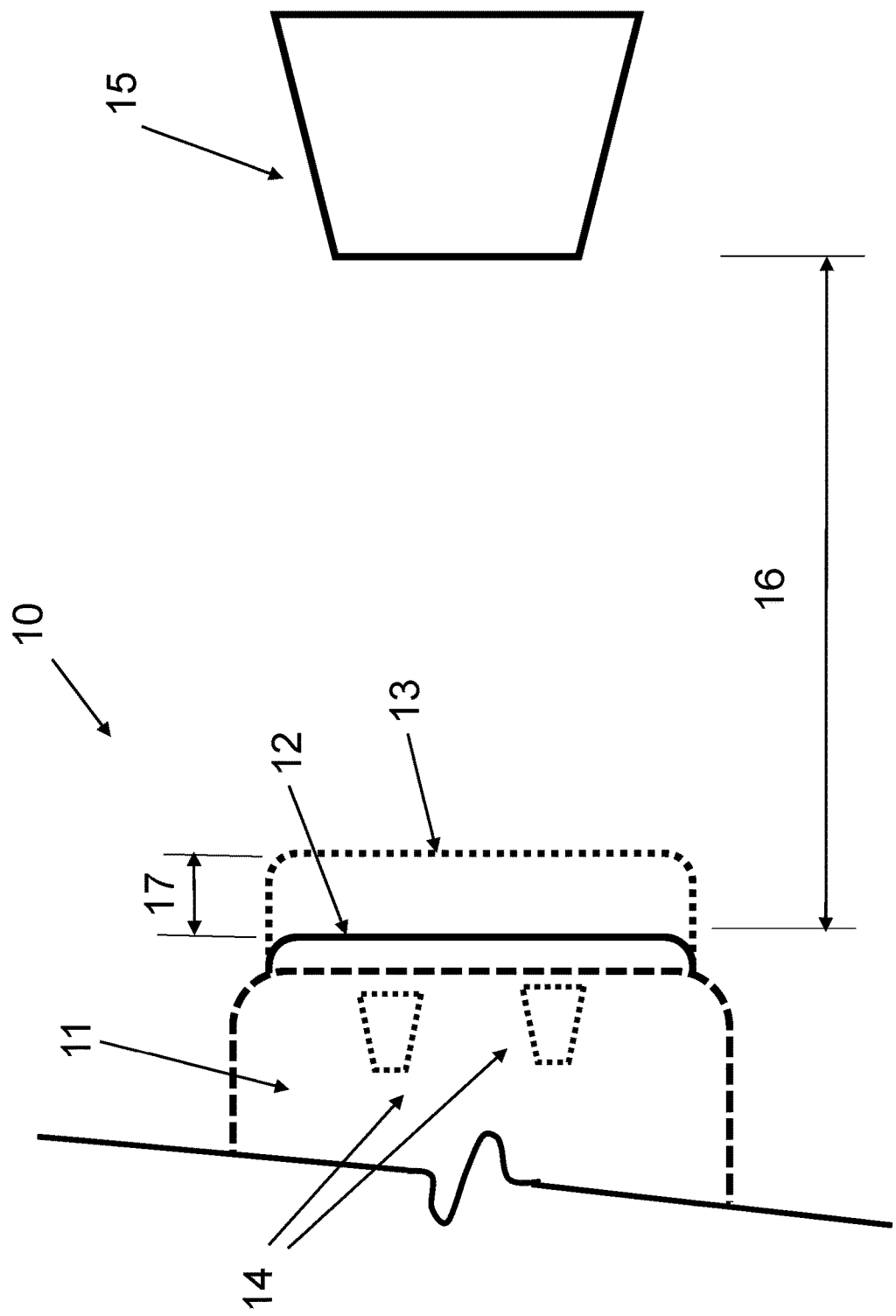

A schematic of the first embodiment is shown in FIG. 1. In FIG. 1, the frontal (or rear) section 11 of a vehicle is shown which is equipped with the deployable bumper 12, shown in its pre-deployment configuration with solid lines. The vehicle is considered to be equipped with a sensory system (not shown but consisting of appropriate electronics depending on the type of sensor being used and can be equipped with one or more microprocessor to perform velocity and acceleration and other related calculations) with at least one sensor 14, which can detect the distance between the (un-deployed) bumper 12 and any stationary or moving object 15 in the path of motion of the bumper. Then when the sensors 14 of the sensory system detects the object 15 and it is at a relative distance 16 between the bumper 12 and the facing surface of the object 15, and after determining the relative velocity and acceleration, i.e., the rate with which the distance 16 is decreasing (relative velocity) and the rate of change of the relative velocity (relative acceleration), then the bumper deployment control unit (not shown and to be described later in this disclosure) will deploy the bumper 12 forward a distance 17 as shown by dashed line in FIG. 1 and indicated by the numeral 13, i.e., extend it away a distance 17 from the vehicle and towards the surface of the object 15. Thereby providing an increased distance for displacement (and possibly deformation) of the bumper 12 from its deployed position 13 before causing damage to the vehicle. In addition, the increased bumper travel allows the provision of appropriate shock absorbing and peak impact force reduction materials and components commonly used in the art and/or those to be described later in this disclosure.

In addition, if the at least one sensor 14 and its related sensory system are provided with the means to measure the aforementioned relative velocity and acceleration or is provided with algorithms to calculate the relative velocity and acceleration, then the information can be used by the bumper deployment control unit to plan an optimal strategy for its deployment. When the bumper deployment system control unit is equipped with the means of varying the rate of deployment profile and possibly the means of varying its stiffness and energy absorption and dissipation characteristics (i.e., stiffness and viscous and dry damping or braking and the like characteristics), then the bumper deployment control unit can use the input relative distance, velocity and acceleration to plan an optimal deployment "trajectory" to minimize damage to vehicle and/or shock loading to the passengers, and possibly to the impacting object. For the case of vehicular collision, the sensors 14 alone or together with other sensors such as camera with a data base can also be used to identify the object vehicle type and provide an estimate of its weight and also facing bumper or vehicle side characteristics for the bumper deployment control unit planning of its said bumper deployment strategy.

The sensors 14 may also be used to determine (exactly or approximately estimate) the location of the impact on the bumper and use the information for the bumper deployment control unit for bumper (unitary, segmented, etc.) optimal deployment strategy. This information can be generated as a function of time before and during the collision process to provide information about the relative position and orientation of the vehicle and bumper and its segments (if any), etc., for optimal deployment for impact shock and energy absorption management and minimization of injury to the passengers and damage to the vehicle.

In one embodiment, the bumpers on vehicles or the vehicle itself broadcast information as to the type of vehicle, whether front or rear, and other characteristics such as weight of the vehicle, the type and size and positioning of the bumper, their deployment state, etc. The information is broadcast by the bumper sensors, particularly if the sensors are RF or laser based by modulating information on their signals. Then if both colliding bumpers have the information, they could coordinate their deployment to minimize damage and impact shock, etc., to both vehicles. The information may be similarly used when a bumper is colliding other sides of the vehicle.

The bumper sensors may be used directly, particularly if they are radar or laser or vision based, or via other sensors mounted on the vehicle such as cameras, to estimate the size, weight, location of the bumper, its orientation and possibly the type of approaching vehicle for planning an optimal bumper deployment strategy.

The sensor may be configured to continuously provide distance measurement between the bumper and the object on its path of travel or the distance information may be provided at discrete time intervals. The sensor may also be configured to provide the distance information at certain time intervals until a collision possibility is detected and then either increase the rate of distance measurements or begin to provide a continuous stream of distance measurement(s). The rate at which the distance information is provided to the deployable bumper control unit must however be high, i.e., the sampling time must be small enough, so that the aforementioned relative velocities and accelerations could be accurately determined for effective bumper deployment and control purposes.

Figure 2:
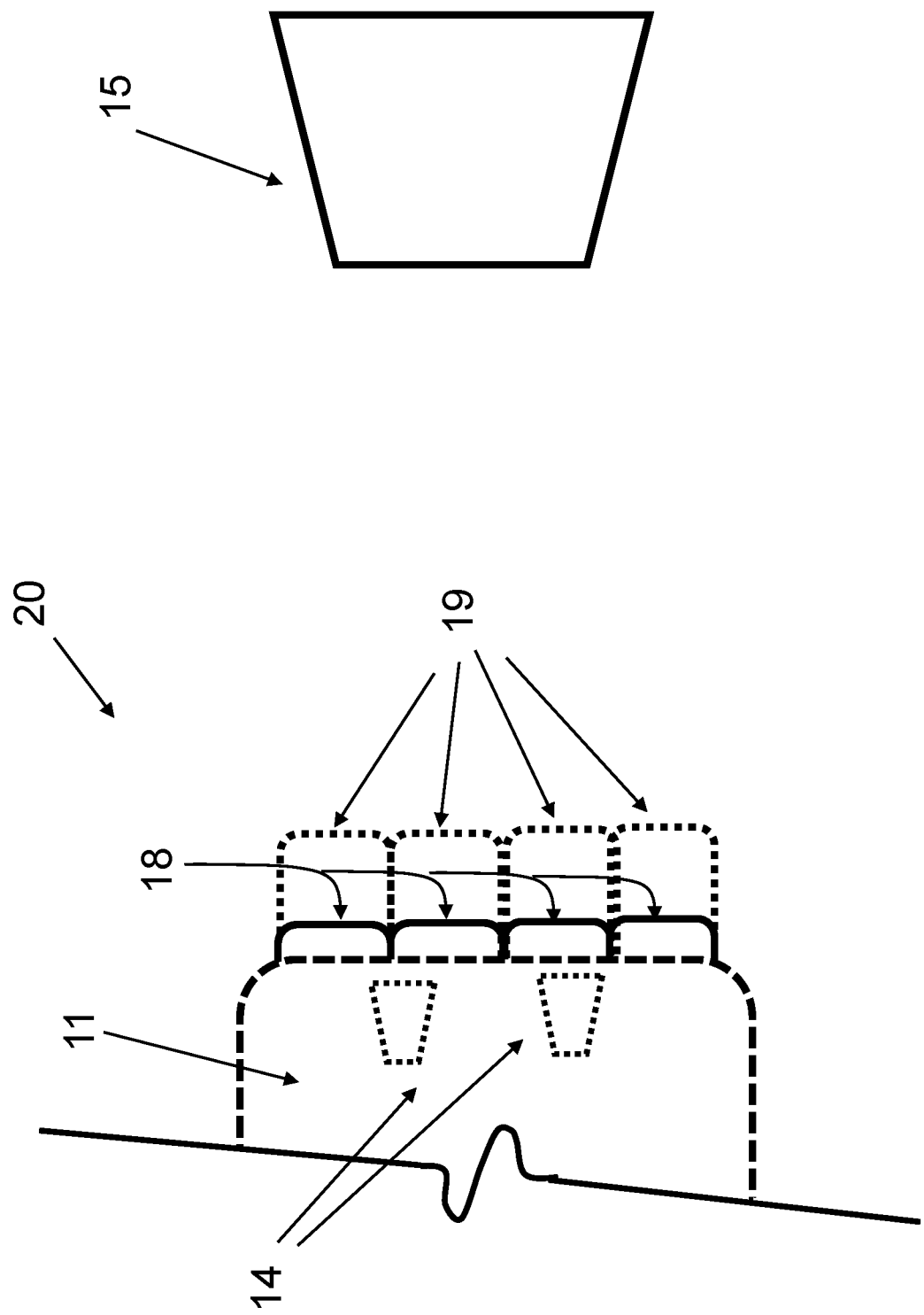
FIG. 2 illustrates a schematic of the second embodiment of a deployable bumper for vehicles and the like constructed with multiple deployable segments.

In the second embodiment 20 shown in the schematic of FIG. 2, the bumper 12 of the embodiment 10 of FIG. 1 which is constructed and deployed as one piece, is instead constructed in several segments 18. By providing several segmented deployable bumpers, each individual segment 18 may be deployed either simultaneously or sequentially. At low speeds and if only a small object is being encountered, the bumper deploying control unit will then also have the option of deploying any one or more of the required bumper segments 18—shown in dashed lines in the schematic of FIG. 2 and indicated collectively by the numeral 19.

Figure 3:
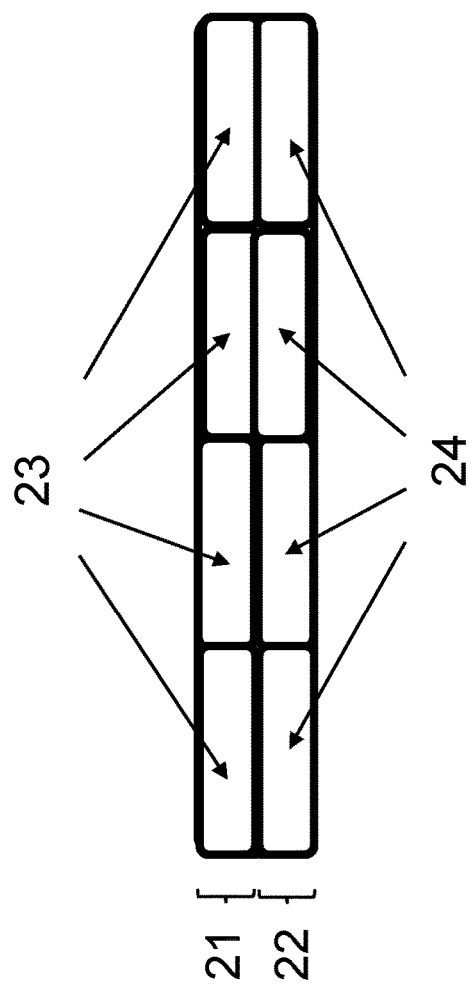
FIG. 3 illustrates the frontal view of a deployable bumper embodiment for vehicles and the like constructed with multiple stacked deployable segments.

In the embodiment 20 shown in the schematic of FIG. 2, the deployable bumper 18 is shown to be constructed of several segments (four in FIG. 2) which can be independently deployed. It is, however, appreciated by those skilled in the art that the bumper may be similarly constructed with several rows of segments or in any other proper shapes and arrangements. The frontal view of one such deployable bumper that is constructed with two rows (indicated by numerals 21 and 22) of four segments (indicated by numerals 23 and 24 for the rows 21 and 22, respectively) is shown in FIG. 3. By providing several segmented deployable bumpers, each individual segment in each rows may be independently deployed to achieve maximum effectiveness. At low speeds and if only a small object is being encountered, the bumper deploying control unit will then also have the option of deploying any one or more of the required bumper segments.

In the embodiments of FIGS. 2 and 3, the deployable bumpers are shown to be constructed of several segments which can be independently deployed. In an alternative embodiment, the main body of the bumper may be fixed to the vehicle but be provided with readily replaceable and independently deployable segments such as shown in the frontal view of FIG. 4. In the frontal view of FIG. 4, the fixed bumper 25 is shown to be provided with three (inserted and essentially flush) independently deployable segments 26. Such bumper systems are particularly advantageous from the repair cost point of view since they can be readily replaced following a collision.

Figure 4:
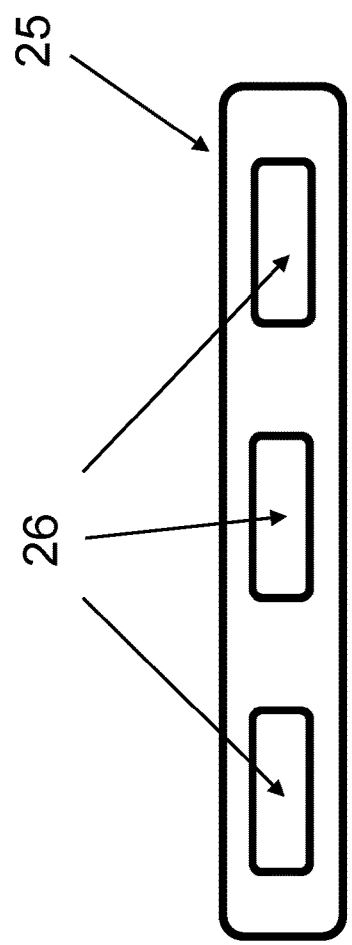
FIG. 4 illustrates the frontal view of another embodiment of a deployable bumper for vehicles and the like with multiple deployable segments that are mounted inside the main bumper body.

In an alternative embodiment, the main body of the bumper shown in the frontal view of FIG. 4 may also be deployable, and be deployed when a more serious collision is predicted by the bumper deployment control unit.

When the bumper is constructed with deployable segments, such as those shown in FIGS. 2-4, a relatively thin (such as plastic) sheet cover may be used to over the bumper assembly to make it appear as a one-piece bumper unit, primarily for the sake of appearance.

As was previously indicated, there are many different methods of deploying the present deployable bumpers and their segments. It is, however, appreciated that some overlapping is inevitable and there is no unique method of classifying such deployment mechanisms. Here, the main objective is to provide a deployment method classification that can be used to describe various deployment options as well as their basic characteristics and distinguishing features as applicable to the embodiments. Examples of embodiments for implementing the described methods may be classified as follows:

1. Providing at least one hydraulic, pneumatic or detonation charge actuated piston that is attached on one end to the vehicle chassis and on the other end to the bumper to directly deploy the bumper or its segments. The same actuation pistons may be used to absorb the impact energy while limiting the force transferred to the vehicle chassis. Alternatively, or in addition, other energy absorbing elements and mechanisms can be included. The mechanical energy absorbing means may be based on viscous damping; friction (dry or Coulomb friction) losses, such as braking action; elastic deformation; plastic deformation; buckling; various modes of failure such by shearing, tensile or compressive, and "tearing"; ejection of fluid, gas or even solid mass; electromagnetic damping mechanisms; and their combinations. All such means of mechanical energy absorption are hereinafter referred to collectively as "mechanical energy absorbing elements".

2. Providing a linkage type mechanism that is used to deploy the bumper or its segments. The linkage type mechanism is attached on one end to the vehicle chassis, directly or through intermediate shock absorbing or elastically or plastically deforming elements, and on the other end(s) to the bumper or its segments, directly or through intermediate shock absorbing or elastically or plastically deforming elements. The deploying linkage mechanism can be provided with various shock loading and energy absorbing elements. The linkage mechanism may be deployed rapidly using various actuation devices, such as one of the following:

a. Use stored potential energy in, for example, spring elements or as pressurized gas, to rapidly deploy the bumper or its segments;

b. Use gas generating pyrotechnics, similar to air bags, to rapidly deploy the bumper or its segments.

Figure 5:
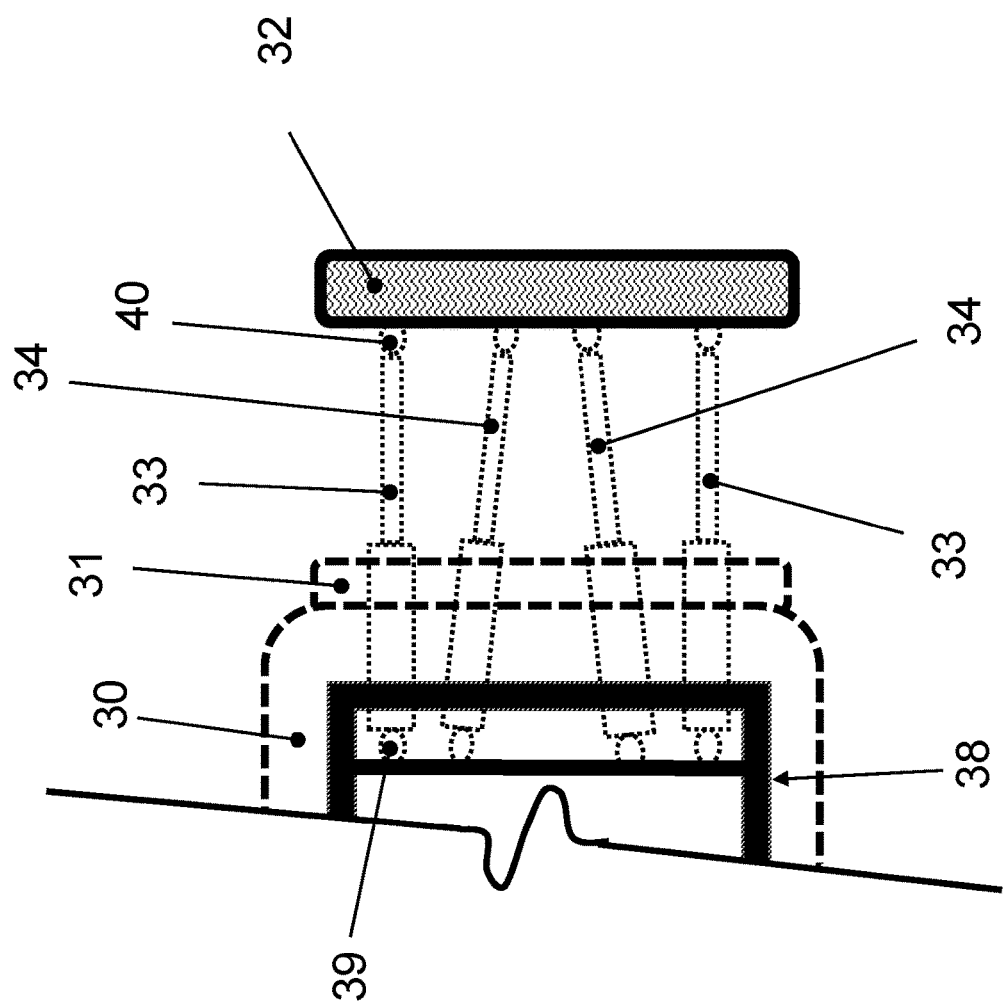
FIG. 5 illustrates the schematic of a deployable bumper for vehicles and the like that is deployed by the action of hydraulic or pneumatic or pressurized gas type or the like pistons arranged in one or more configurations.

The schematic of the embodiment of in FIG. 1 showing the frontal (or rear) section 30 (11 in FIG. 1) of a vehicle is shown in FIG. 5, which is equipped with a deployable bumper, shown in its pre-deployment configuration 31 with dashed lines. The vehicle is considered to be equipped with a sensory and control system as was previously described for the embodiment of FIG. 1 for determining the proper time for deploying the bumper, at which time the bumper deployment control unit will deploy the bumper from its pre-deployment configuration 31 forward a certain distance as was described for the embodiment of FIG. 1 as shown by solid lines and indicated by the numeral 32 in FIG. 5. In this embodiment, the bumper 32 is deployed by a pairs of pistons 33 and 34, which are configured for straight and angled deployment directions, respectively, as shown in FIG. 5. It is, however, appreciated by those skilled in the art that any number of deploying pistons may be used and be deployed in almost any configuration. The deployment pistons can be attached to the car chassis 38 by rotary joints 39, from which they extend to the bumper 35 and are attached to the bumper 35 by another rotary joint 40 (both joints are shown only for one of the pistons).

Figure 6:
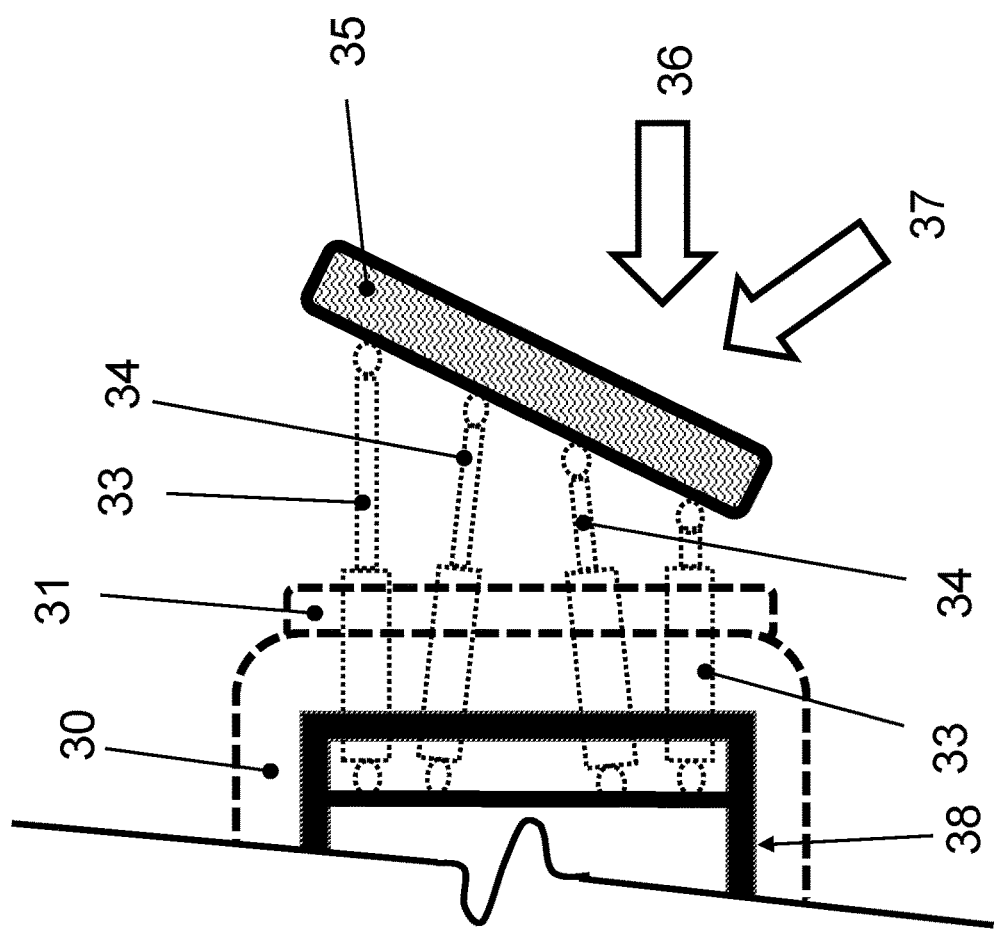
FIG. 6 illustrates the schematic of the bumper of FIG. 5 having been deployed at an angle for an expected sidewise impact.

It will be appreciated by those skilled in the art that the pistons 33 and 34 may be extended in a step-wise manner by the vehicle impact detection and bumper deployment control system to a range of configurations, including those shown in FIGS. 5 and 6, depending on the direction of the expected impact and the expected relative velocity between the vehicle and the impacting object to achieve maximum effectiveness. The pistons 33 and 34 may have a telescopic design, which are well known in the art, to provide longer deployment distances with relatively shorter piston cylinder packages.

The pistons 33 and 34 may be hydraulically or pneumatically actuated or may use detonation of gas generating charges for piston actuation. The pistons may also be actuated by preloaded compressive springs provided inside or outside the pistons. In general, pneumatic pistons using gas generated by detonation of gas generating pyrotechnics can be provided due to low weight, fast actuation and elimination of the need of fire hazard that hydraulic fluids generally pose and/or sealing requirement that must hold over many years that vehicles are used and to minimize maintenance costs. The deployment signal can then be used to initiate the gas generating pyrotechnic material, or release compressed gas to actuate the piston directly or inject the hydraulic fluid into the deployment pistons via electrically actuated valves.

In general, the use of gas generating pyrotechnic materials can be provided since they are very fast acting and occupy minimal volume with minimal weight. In addition, more than one gas generating charge can be provided that can be initiated when needed to achieve the desired level of gas pressure to match the expected impact velocities.

In general, the vehicle sensors can continuously measure the relative distance, velocity and acceleration of other approaching objects (such as other vehicles), even if the vehicle is not in motion, and would optimally deploy the bumper that is expected to be impacted. This capability provides the means of minimizing damage as a result of being rear ended while after a stop or in case of a pile up on fog or ice covered roads or the like.

The bumper deployment system may even be left active while the car is in parked condition with and without any onboard passengers.

The pistons 33 and 34 shown in the embodiment of FIG. 5 may also be used as the means to absorb energy during the impact by providing appropriate orifices to discharge the deploying gas (or oil in case of pistons actuated by hydraulic fluid) and to provide the desired level of resisting force at different deformation rates during the impact. Such gas and oil operated mechanisms are well known in the art and are routinely used in impact dampers and shock absorbers of various types.

It will also be appreciated that at least one of the pistons 33 and/or 34 may only be used to rapidly deploy the bumper upon the system control signal but other shock absorbing and energy dissipating mechanisms be used to reduce the impact induced forces acting on the car chassis and to absorb the related kinetic energy. In general, the advantage of the aforementioned mechanisms of using gas or hydraulic fluid discharge through provided orifice(s) have the advantage of providing larger resisting forces at higher relative impact velocities. For example, the resisting force, thereby the rate of energy absorption, may be designed to increase linearly with increased relative velocity (between the vehicle and the fixed or moving object being impacted). The resisting force may also be designed to be proportional nearly to the square of the relative velocity. As a result, at lower relative velocities, the reaction forces on the bumper during the impact and therefore acting on the vehicle and experienced by the vehicle passengers is reduced. In general, the disadvantage of such impact shock absorbing mechanisms is that they can become a relatively large volume in the vehicle.

In the schematic of FIG. 5 the bumper 32 is shown to be deployed parallel to the car and its chassis. The bumper may, however, be deployed at an angle, for example, as shown in FIG. 6 and indicated by the numeral 35, for impacts in the direction of, for example, the arrow 36 or 37. For such bumper deployment configurations, the deployment distance of the pistons 33 and 34 are individually controlled.

Figure 7:
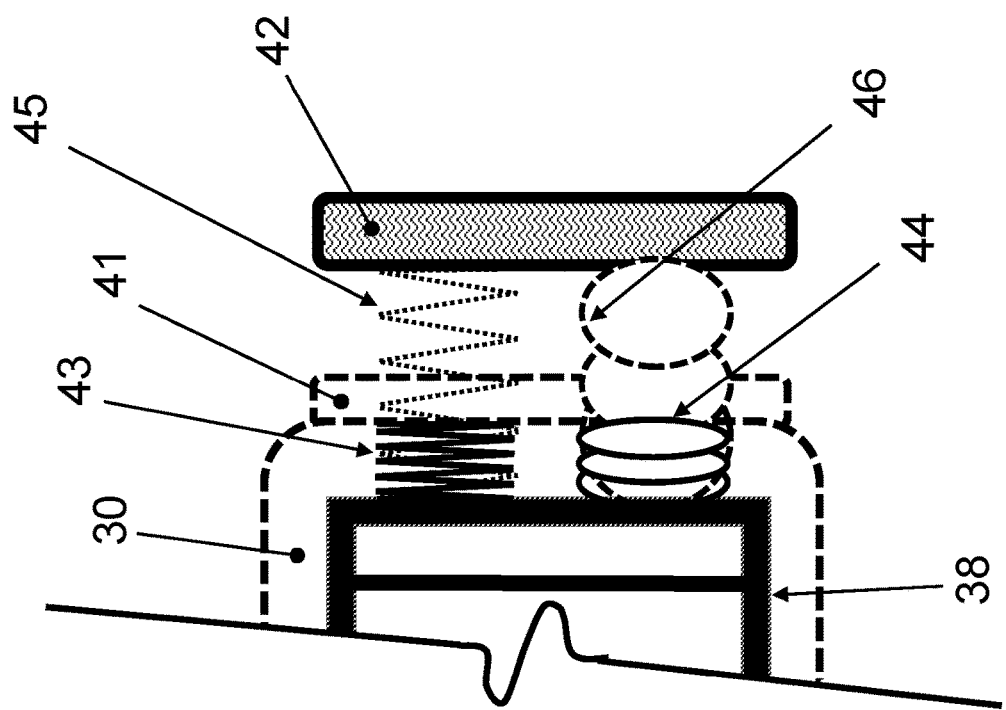
FIG. 7 illustrates the schematic of a deployable bumper for vehicles and the like that is deployed by the action of at least one compressively preloaded spring and/or at least one pressurized elastic bellow.

In another embodiment shown in the schematic of FIG. 7, the deployable bumper in the front or rear section of the vehicle shown in FIG. 1, is deployed by compressively preloaded springs, which may be constructed as helical or the like springs or as pressurized elastic bellows, such as rubber type air bellows, that are released by the vehicle impact detection and bumper deployment control system. In the schematic of FIG. 7 only one such spring 43 (shown with solid lines) and one pressurized elastic bellow 44 (shown with solid lines) element are shown for the sake of clarity to deploy the bumper from its pre-deployment configuration 41 shown with dashed lines forward a certain distance as was described for the embodiment of FIG. 1 and shown by solid lines and indicated by the numeral 42 in FIG. 7. In FIG. 7 the deployed compressively preloaded spring 43 is shown with dashed lines and indicated by the numeral 45 and the deployed pressurized elastic bellow 44 is shown with dashed lines and indicated by the numeral 46. It will be appreciated by those skilled in the art that any number of deploying compressively preloaded springs or pressurized elastic bellows may be used and be deployed in almost any configuration to achieve a parallel or angled bumper deployment as shown in FIGS. 5 and 6, respectively.

In the embodiment of FIG. 7, the rubber type air bellows 44 may be provided with compressed air by an air compressor. In the embodiment, however, the compressed gas can be provided by gas generating charges that are initiated when needed to achieve the desired level of gas pressure. Each rubber type air bellow 44 can be provided with several gas generating charges that can be initiated independently by the vehicle impact detection and bumper deployment control system depending on the expected relative velocity between the vehicle and the impacting object.

It will be appreciated by those skilled in the art that when using compressively preloaded springs, such as the springs 43 in the embodiment of FIG. 7, a release mechanism, which can be operated by a solenoid valve, can be provided to keep the spring in its compressed configuration. Such solenoid operated release mechanisms for releasing mechanisms with preloaded springs are well known in the art and are used in vehicles, for example for opening trunks. It will also be appreciated by those skilled in the art that more than one spring may be configured in series or in parallel or any such combinations and be released sequentially by the vehicle impact detection and bumper deployment control system depending on the expected relative velocity between the vehicle and the impacting object for maximum effectiveness.

It will also be appreciated by those skilled in the art that the aforementioned assemblies of springs 43 and pressurized elastic bellows 44 may be deployed sequentially by the vehicle impact detection and bumper deployment control system to a range of configurations, including those shown in FIGS. 5 and 6, in one or multiple steps, depending on the direction of the expected impact and the expected relative velocity between the vehicle and the impacting object to achieve maximum effectiveness.

Figure 8:
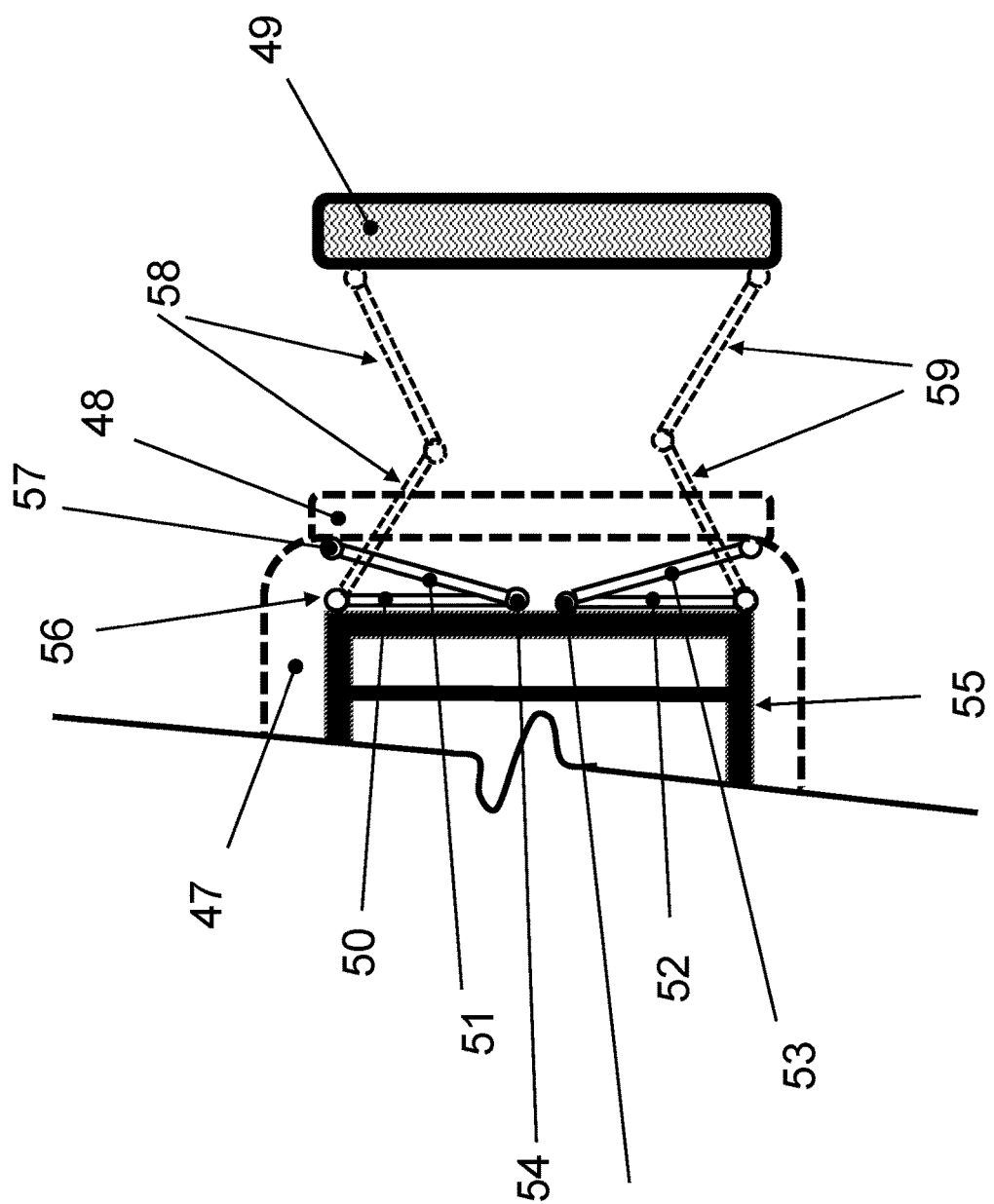
FIG. 8 illustrates the schematic of a deployable bumper for vehicles and the like that is deployed by a linkage type mechanism.

In another embodiment, the deployable bumper in the front or rear section of the vehicle is deployed using linkage type mechanisms. Numerous such mechanisms may be used for this purpose, an example of which is shown in the schematic of FIG. 8. The schematic of the embodiment of FIG. 8 shows the frontal (or rear) section 47 (11 in FIG. 1) of a vehicle, which is equipped with a linkage mechanism for deploying the provided bumper, shown in its pre-deployment configuration 48 with dashed lines. The vehicle is still considered to be equipped with a sensory and control system as was previously described for the embodiment of FIG. 1 for determining the proper time for deploying the bumper, at which time the bumper deployment control unit will deploy the bumper from its pre-deployment configuration 48 forward a certain distance as was described for the embodiment of FIG. 1 as shown by solid lines and indicated by the numeral 49 in FIG. 8.

In this embodiment, two independent linkage mechanisms, one consisting of the links 50 and 51 and the other with the links 52 and 53 (all shown with solid lines) are used to deploy the bumper from its configuration 48 to configuration 49 as shown in FIG. 8. In the first mechanism, the links 50 and 51 are connected by the rotary joint 54. The links 50 and 51 are attached to the vehicle chassis 55 and the bumper 48, respectively, by the rotary joints 56 and 57. The links 52 and 53 of the other second mechanism are similarly attached together and to the vehicle chassis and the bumper by rotary joints. In this embodiment, the bumper is deployed from its position 48 to position 49 by the two linkage mechanisms from their "folded" configuration shown with solid lines to their deployed configurations 58 and 59 as shown with dashed lines in FIG. 8.

It will be appreciated by those skilled in the art that the deploying linkage mechanisms of the embodiment of FIG. 8 could be actuated to their configurations 58 and 59 shown in FIG. 8 using various actuation devices, such as compressively preloaded springs (43 in FIG. 7) or pressurized elastic bellows (44 in FIG. 7) or hydraulically or pressurized air or gas operated pistons (33 and 34 in FIGS. 5 and 6), as was previously described, or by using electrical motors (not shown) to drive one of the links, such as the links 50 and 52, which are attached to the vehicle chassis. It will also be appreciated by those skilled in the art that the actuation devices may be used to directly or through intermediate means of motion transmission drive the linkage mechanism.

It will also be appreciated by those skilled in the art that the linkage mechanism actuation devices may be used to deploy in several sequential steps by the vehicle impact detection and bumper deployment control system to a range of configurations, including those shown in FIGS. 5 and 6, depending on the direction of the expected impact and the expected relative velocity between the vehicle and the impacting object to achieve maximum effectiveness.

It will also be appreciated by those skilled in the art that multiple linkage mechanisms may be connected in series or in parallel or the combination thereof to achieve longer deployment distances as well as the means of sequentially (step-wise) deploying the bumper at increased distances.

In the embodiments of FIGS. 5-7, the bumpers are shown to be deployed by a single set of means of deployment, which are essentially positioned in a single layer (plane). It is, however, appreciated by those skilled in the art that multiple layers (in the height direction of the vehicle) of such deployment means may also be used for this purpose. The same is also true for the linkage mechanism used for bumper deployment as shown in the schematic of FIG. 8. In addition, multiple linkage mechanisms (two shown in the schematic of FIG. 8) may also be used in each layer.

In the embodiments of FIGS. 5-8, the vehicle is shown with a single (frontal or rear) deployable bumper. It is, however, appreciated that when bumpers are constructed with multiple segments such as those shown in FIGS. 2-4, then the bumper segments may deployed together or sequentially using any one or combination of deployment means described for the embodiments of FIGS. 5-8, depending on the direction of the expected impact and the expected relative velocity between the vehicle and the impacting object to achieve maximum effectiveness.

It will be appreciated by those skilled in the art that the bumper deployment system may be equipped with sensors that measure the forces/moments/torques being applied to the bumper system. This information can in turn be used by the bumper deployment control unit to optimally plan its deployment strategy as well as its shock and energy absorption strategy to minimize peak vehicle shock loading, minimize damage to the vehicle, minimize passenger discomfort and injury, etc.

It will also be appreciated by those skilled in the art that the vehicle sensors directly or via other sensors, such as cameras, can be used to estimate the size, weight, location of the other vehicle bumper, its orientation and possibly the type of approaching vehicle for planning an optimal bumper deployment strategy to achieve maximum effectiveness in terms of minimizing passenger discomfort and injury and damage to the vehicle.

The same information can also be relayed to the vehicle control units that control the deployment of the air bag—for example to initiate one or more gas generating units to achieve optimal air bag pressure to minimize injury to the occupants—from impacting objects as well from as fast moving and stiff air bag surfaces. The information may also be used to tighten the seat belts and take other measures such as control the rate of car braking, etc.

In one embodiment, the vehicle broadcasts the type of bumper and vehicle and characteristics such as weight, the number of passengers and their location in the vehicle, the bumper deployment state, etc. The information may be broadcasted by the bumper sensors (particularly if the sensors are RF or laser based—by modulating information on their signals). Then if both colliding bumpers have the information, they could coordinate their deployment to minimize damage and impact shock, etc., to both vehicles and their passengers. The information may be similarly used when a bumper is colliding the sides of the vehicle.

It will also be appreciated that following a serious impact with a fixed or moving object, the bumper and its deployment and energy absorption components may be seriously damaged and therefore must be replaced. When the damage to the components is minimal, then the deployed bumper needs to be retracted.

It is appreciated that when the bumper (one-piece or segmented) is deployed using hydraulic or pneumatic cylinders or electric motors, such as those shown in FIGS. 5, 6 and 8, then the same actuation devices and mechanisms may be used to retract the bumper or its segments. However, when the bumper or its segments are deployed using gas generating pyrotechnics or preloaded springs or the like, then additional means must be used to retract the bumper or its segments.

In one embodiment, at least one retracting cable is used to retract the bumper or its segments to its non-deployed position. The cables may be provided with hooks, which are engaged with eyelets on the back of the bumper. The cable may then be retracted by a manually operated or electrically operated winch, can be attached to the car chassis. In such bumpers, the bumper or its segments must be retracted until the aforementioned (solenoid operated or the like) latching mechanism is engaged. When a manually operated winch is used, the winch can be operated by the car lug nut wrench.

Alternatively, the bumper mechanism may not be provided with any retracting mechanism, usually to minimize cost and added weight and complexity, and would require to be retracted using a retracting fixture and mechanism at, for example, at a properly equipped garage.

In all disclosed embodiments, the impact shock loading level reduction and energy absorbing elements may include mechanisms based on shearing or tensile or compressive failure or buckling of structural elements provided in the path of deforming bumper or its individual segments during the object impacting process. For example, the bumper segment elements 26 in FIG. 4 (indicated as the element 60 in the schematic of FIG. 9) could be guided outward freely inside the bumper segment housing 63 in the bumper (25 in FIG. 4) in the direction of the arrow 61 by the provided deployment mechanism (not shown) as previously described. The surfaces of the bumper segment housing 63 are provided with shearing elements 64, which are flexible enough in bending to allow relatively free deployment of the bumper segments 60 (in the direction of the arrow 61), effectively allowing the assembly to act as a well-known ratchet mechanism. The shearing elements 64 can be distributed over the entire interior surfaces of the bumper segment housing and can be designed with shearing strengths to limit the impact shock loading to a prescribed level. All or a portion of the shearing elements 64 may also be made of viscoelastic material or have a composite structure that includes viscoelastic materials so that their resistance to shearing increases with the impact induced shearing velocity, i.e., the rate at which the bumper segments 60 are driven back in the direction of the arrow 62. As a result, at low impact velocities, the shock loading experienced by the vehicle and thereby its passengers become lower, while minimizing the chances of damage to the vehicle itself.

Figure 9:
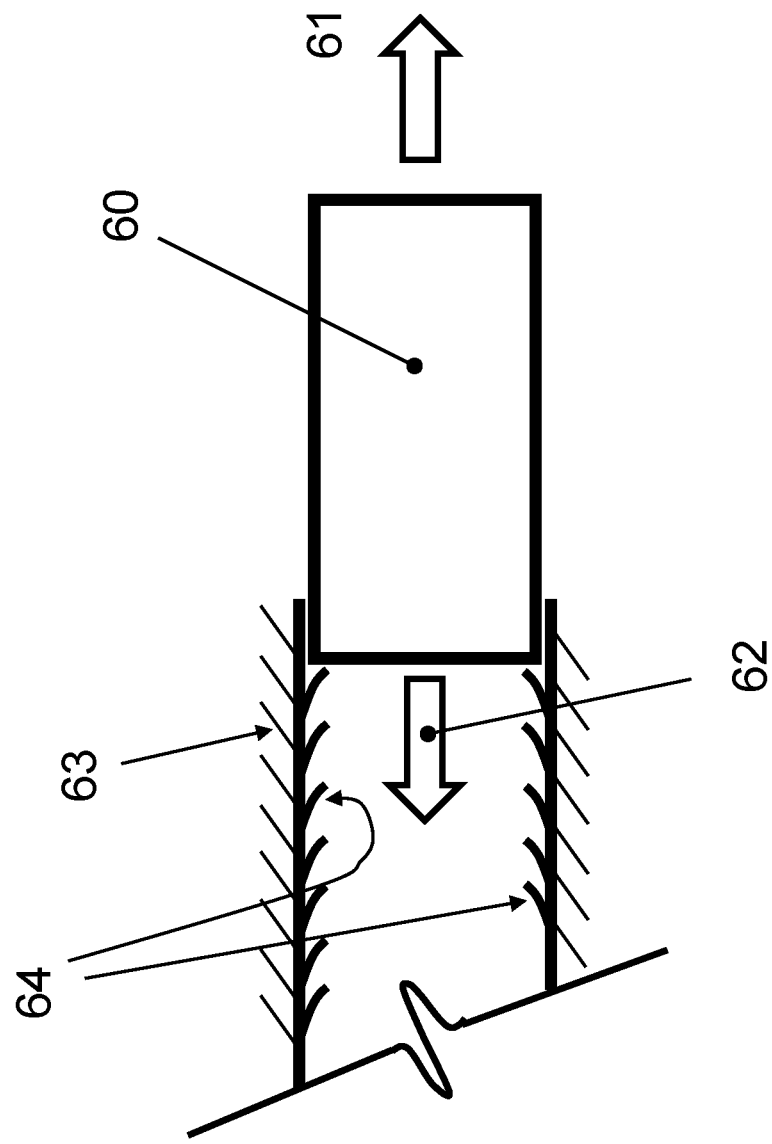
FIG. 9 illustrates the schematic of one possible shearing based impact shock loading control and energy absorption mechanism for deployable bumpers and bumper segment embodiments.

In the schematic of FIG. 9, the shearing elements 64 are shown to be fixed to the inside surfaces of the bumper segment housing 63. However, in the embodiment the shearing elements are attached by simply snapping them in place from the outside of the bumper segment housing 63 to facilitate the removal of the sheared elements and for their replacement following deployment and their shearing during the impact.

Figure 10:
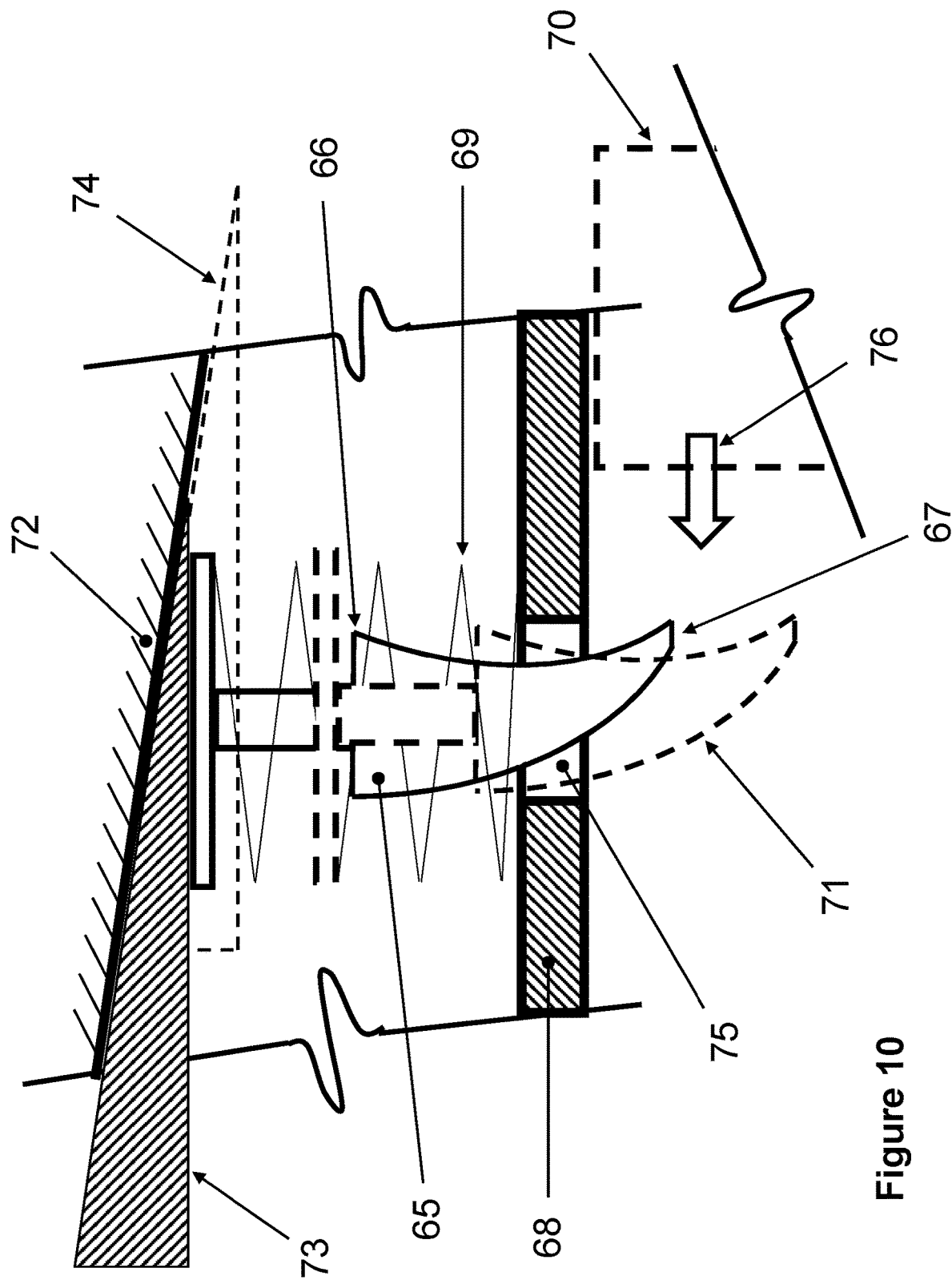
FIG. 10 illustrates the design of a shearing strength adjustable shearing element for shearing based impact shock loading control and energy absorption mechanism for deployable bumpers and bumper segment embodiments.

In the schematic of FIG. 9 the shearing elements 64 are shown to be fixed to the inside surfaces 63 of the bumper segment housing. As a result, the shearing force required for their shearing by the bumper segments 60 and the energy absorbed during the shearing action is fixed. In an alternative embodiment shown schematically in FIG. 10, the shearing elements 65 (64 in FIG. 9) are adjustable to vary their shearing strength. FIG. 10 illustrates a cross-sectional view of the bumper segment housing wall and the shearing element 65 and its variable deployment mechanism.

In this embodiment, the shearing elements 65 have varying thickness and/or width as shown in FIG. 10, providing them with smaller cross-sectional area (shearing surface), having largest cross-sectional area at their base 66 and smallest close to their free tip 67. The shearing elements 65 are movable through openings 75 in the walls 68 of the bumper segment housing. In an embodiment, the shearing elements 65 are provided with preloaded compressive spring elements 69, which bias the shearing elements in the direction of being retracted (shown with solid lines) from engagement with the bumper segment 70 (60 in FIG. 8) as it is moved during an impact in the direction of the arrow 76. The shearing elements 65 can then be pushed further into the bumper segment housing as shown with dashed lines and indicated by the numeral 71 in FIG. 10 by, for example, the wedging mechanism consisting of a vehicle fixed profile 72 and the moving element 73 with matching profile. In FIG. 10, the moving part of the wedge mechanism 73 is shown with solid lines at which position the shearing elements 65 are at their minimum deployment position and with dashed lines (indicated by the numeral 74) at which position the shearing elements 65 are at near their maximum deployment position.

Figure 11:
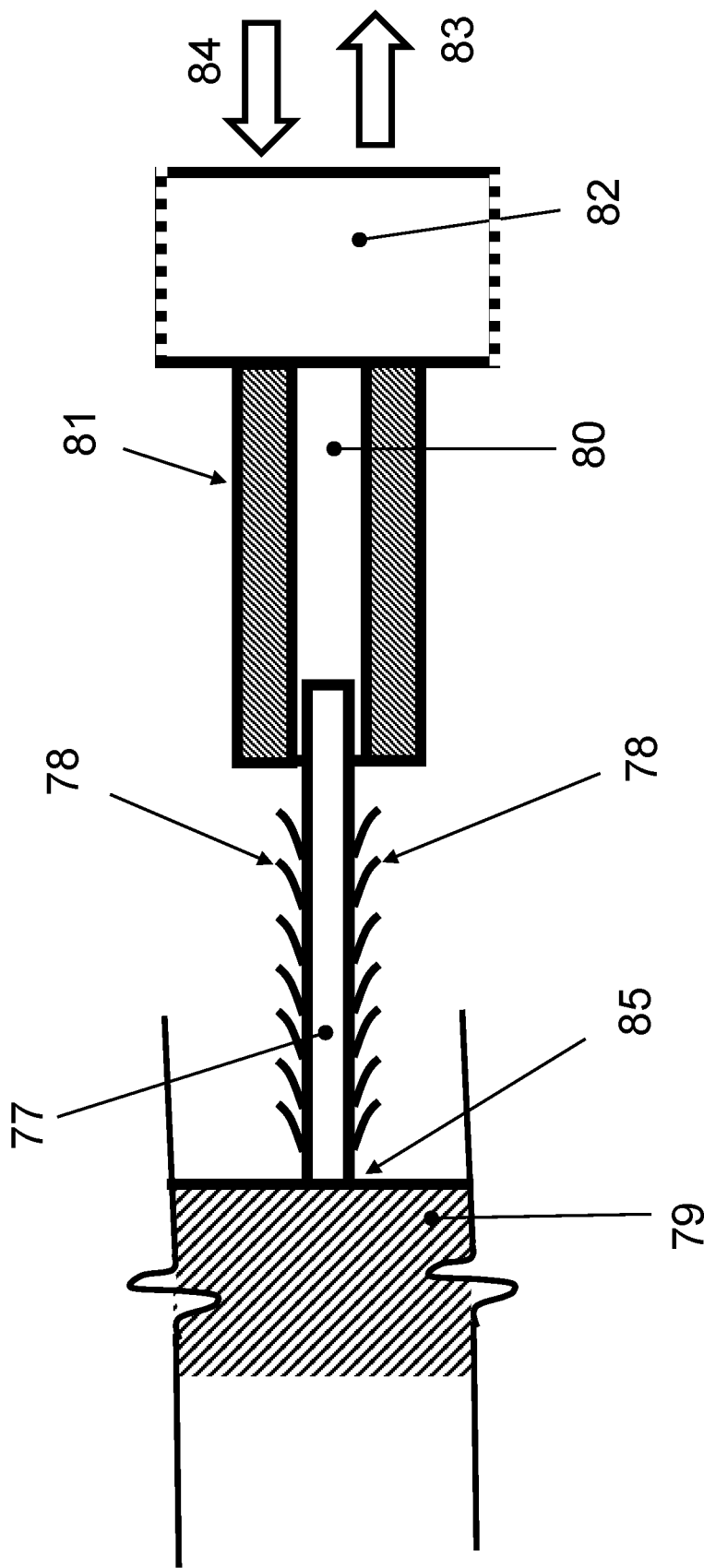
FIG. 11 illustrates an alternative design of the shearing based impact shock loading control and energy absorption mechanism for deployable bumpers and bumper segment embodiments.

It will be appreciated by those skilled in the art that the shearing mechanisms shown in the schematics of FIGS. 9 and 10 may also be configured in numerous other ways. For example, the fixed or adjustable shearing elements, 64 and 65 in FIGS. 9 and 10, respectively, may be attached to the bumper or its segments (60 and 70 in FIGS. 9 and 10, respectively) instead of the walls of the bumper housing (63 in FIG. 9). An example of such a shearing mechanism based shock loading level control and impact energy absorption mechanism unit is shown in the cross-sectional view of FIG. 11. In this embodiment, a relatively rigid structural element 77 is fixed to the vehicle, such as its chassis 79 as shown in FIG. 11. The previously described shearing elements 78 (64 in FIG. 9) are fixedly attached to the structural element 77. The shearing elements 78 are relatively flexible such that they would deflect towards the surface of the structural element 77 to fit inside the guiding opening 80 in the support element 81 of the bumper (or bumper segment) 82. As a result, the bumper 82 can be deployed using one of the previously described methods and actuation devices (in the direction of the arrow 83) with minimal resistance. However, as the bumper 82 is displaced in the direction of the arrow 84 as a result of impact with a fixed or moving object, the support element 81 would begin to shear the shear elements 78 as it rides over the structural element 77 as was described for the embodiments of FIGS. 9 and 10.

The shearing elements 78, FIG. 11, can be distributed over the entire surface of the structural element 77 and are similarly designed with shearing strengths to limit the impact shock loading to the vehicle to a prescribed level during impact. All or a portion of the shearing elements 78 may also be made of viscoelastic material or have a composite structure that includes viscoelastic materials so that their resistance to shearing increases with the impact induced shearing velocity, i.e., the rate at which the bumper (or bumper segment) 82 is driven back in the direction of the arrow 84. As a result, at low impact velocities, the shock loading experienced by the vehicle and thereby its passengers become lower, while minimizing the chances of damage to the vehicle itself.

The shearing mechanism of FIG. 11 may also be provided with adjustable shearing elements 78 similar to those shown in the schematic of FIG. 10, in which case the shearing elements will be designed similar to that shown in FIG. 10 with preloaded spring and assembled inside a hollow (cylindrical or rectangular) structural element 77. The shearing element outward movement for shearing force adjustment is then achieved by a similar wedging element, which might for example be conical in shape and would radially expand as it is moved forward against the matching inclined surfaces provided on the outer surface of the wedging cylinder.

The shearing mechanism shown in FIG. 11 can be designed to occupy significantly smaller volume than that of FIG. 9. As a result, it would allow the use of more such mechanisms in each bumper or its segments.

It is appreciated by those skilled in the art that more than one shearing mechanism such as the one shown in FIG. 11 can be used on a bumper or its segments (FIGS. 1-4), such as shown for example in FIGS. 5-8. In an embodiment, several shearing mechanisms are used to provide the required level of shock loading level control and energy absorption capability.

In one embodiment, the attachment of the structural element 77 to the chassis 79, FIG. 11, is by a removable pin (not shown), which is operated by a solenoid or other actuation device (not shown). As a result, the bumper deployment control unit can remove the pin to free the structural element, thereby preventing one or more of the present shearing mechanisms from resisting the impact induced shock loading of the bumper. The bumper deployment control unit can therefore optimally plan its deployment strategy as well as its shock and energy absorption strategy to minimize peak vehicle shock loading, minimize damage to the vehicle, minimize passenger discomfort and injury, etc.

In another embodiment, instead of the shearing elements shown in FIGS. 9-11, braking elements can be used to generate friction forces that resist displacement of the deployed bumper due to the applied shock loading during an impact with a fixed or moving object. The braking mechanism can be operated mechanically and automatically function to provide braking forces without the need for hydraulic, pneumatic, electrical or any other actuation devices to minimize weight and volume of each braking mechanism unit. To this end, the braking mechanism can be designed to operate as a one-way clutch, i.e., with minimal resistance to bumper deployment (in the direction of the arrow 83 in FIG. 11), but applies the braking force to resist the movement of the deployed bumper by the applied shock loading during an impact (in the direction of the arrow 84 in FIG. 1). Such a braking mechanism may, for example, be designed as shown in FIGS. 12 and 13.

Figure 12:
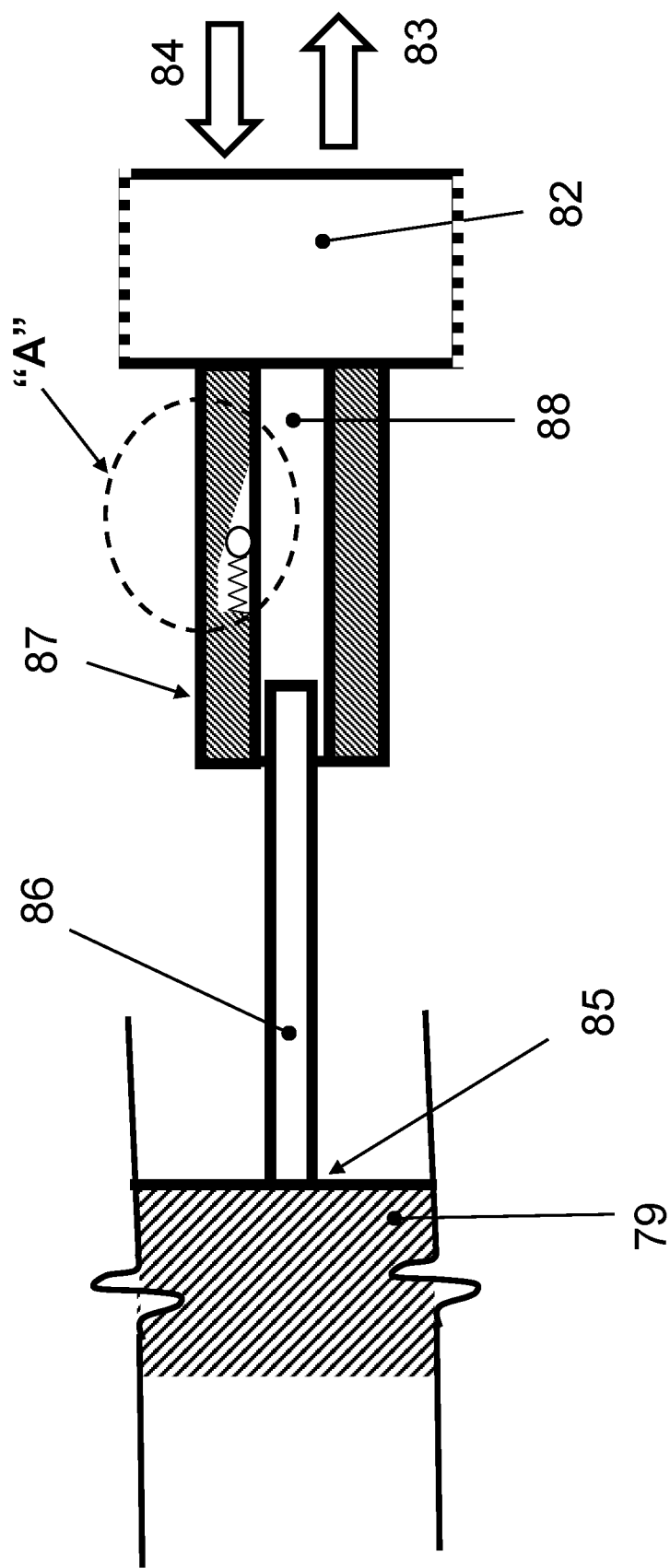
FIG. 12 illustrates an example of the design of a braking-based impact shock loading control and energy absorption mechanism for deployable bumpers and bumper segment embodiments.

In the "one-way clutch" type braking mechanism shown in FIG. 12, all the elements of the device are identical to those of the shearing based mechanism of FIG. 11, except for its structural element 86 (77 in FIG. 11) and the support element 87 (81 in FIG. 11), inside which the "one-way clutch" type braking units are mounted. The details of the basic design of a "one-way clutch" type braking unit is shown in the blow-up view "A" (FIG. 12) of FIG. 13. In the blow-up view "A" the structural element 86 is shown in its "one-way clutch" engagement configuration. In this embodiment, the support element 87 is provided with at least one pocket 89 which has an inclined surface portion 90 as shown in FIG. 13. In the pocket 89 is positioned a relatively rigid ball 91, which is biased by the preloaded spring 92 to be positioned against the inclined surface portion 90 of the pocket. In the configuration shown in FIG. 13, i.e., with the engaged positioning of the structural element 86, the ball 91 is pressed against the inclined surface portion 90 as well as the surface of the structural element 86.

Now it is appreciated that during the bumper deployment, support element 87 (81 in FIG. 11) moves in the direction of the arrow 93 relative to the structural element 86. As a result, the ball 91 is continuously pushed away from the inclined surface portion 90 of the pocket 89 of the support element 87, thereby provide minimal resistance to bumper deployment. However, during bumper impact with a fixed or moving object, the bumper (82 in FIG. 12) and thereby its support element 87 is forced to move in the direction of the arrow 94 relative to the support element 87, thereby forcing the ball 91 against the inclined surface portion 90 of the pocket 89 and the surface of the structural element 86. By providing an inclined surface 90 with a relatively small angle, the friction forces generated between the ball 91 and the contacting surfaces would generate a relatively high resisting friction force that would resist the imparted impact induced shock loading and also absorb a relatively large amount of impact energy.

Figure 13:
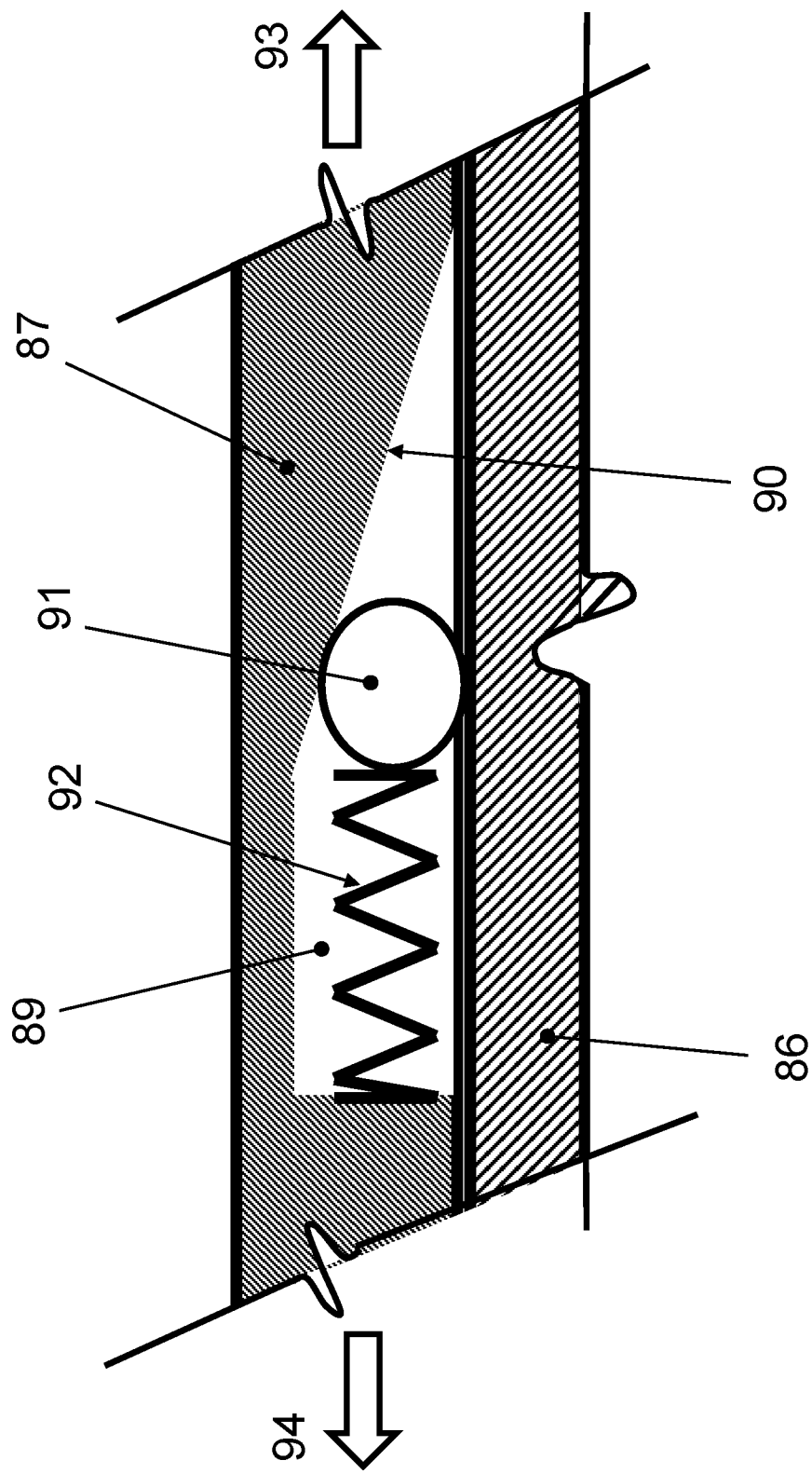
FIG. 13 illustrates an example of the design of the "one-way clutch" type unit of the braking-based impact shock loading control and energy absorption mechanism of FIG. 12.

In the schematics of FIGS. 12 and 13, the braking unit is shown to be assembled into the support element 87 since they can be readily installed and replaced from the outside of the support element 87. The braking units may, however, be also mounted on the surface of the structural element 86.

In the schematics of FIGS. 11 and 12 the shearing and braking based shock loading control and energy absorption mechanisms, respectively, are shown to be fixedly attached to the vehicle chassis on one end and to the bumper or its segments on the other end. It is, however, appreciated by those skilled in the art that both mechanisms may be attached to the vehicle chassis (the structural elements 77 and 86 of FIGS. 11 and 12, respectively) and the bumper or its segments (the support element 81 and 87 of FIGS. 11 and 12, respectively) by rotary joints. As a result, the bumper can then be deployed at an angle, for example, as shown in FIG. 6, for impacts in the direction of, for example, the arrow 36 or 37.

It will be appreciated by those skilled in the art that in addition to the aforementioned means of controlling shock loading during impact with a fixed or moving object and absorbing impact energy, the various structures involved, including the bumper and its segments (if any), the deployment elements and mechanisms, even the links of linkage mechanism (FIG. 8) can be designed to collapse, particularly during higher velocity impacts, to assist in controlling the shock loading levels and in absorbing part of the impact energy.

In the above embodiments, deployable bumpers were described as installed in the front or rear of a vehicle or any other moving platform such as boats, etc. It is, however, appreciated by those skilled in the art that the disclosed deployable bumper systems may also be installed on the sides of vehicles to be deployed at once or in a step-wise manner or sequentially when consisting of several segments by the vehicle impact detection and bumper deployment control system depending on the expected relative velocity between the vehicle and the impacting object for maximum effectiveness.

It will be appreciated by those skilled in the art that the disclosed deployable bumpers can also be designed for use as stationary bumpers for different machinery, such as industrial machines such as CNCs, robotic systems, assembly lines and the like. In such applications, the bumper may be installed on the moving part or on the stationary (usually structure) of the machine or system. Such deployable bumpers are particularly useful since for the same amount of space that would be occupied by regular shock absorbing bumpers, they could provide significantly more protection and provide an optimal shock loading profile to minimize damage and maximize energy absorption.

It will also be appreciated by those skilled in the art that the disclosed deployable bumpers can also be designed for use on trains, in which case, due to the large momentum of a train, the kinetic energy of the train can be absorbed by "bumpers" deployed from the rail area to sequentially impact the chassis of the locomotive and the cars. In the station areas where platforms are provided the bumpers may be deployed from the platforms to absorb the kinetic energy of the runaway train by friction as well as shearing or tearing actions as were previously described for vehicular bumpers.

Figure 14:
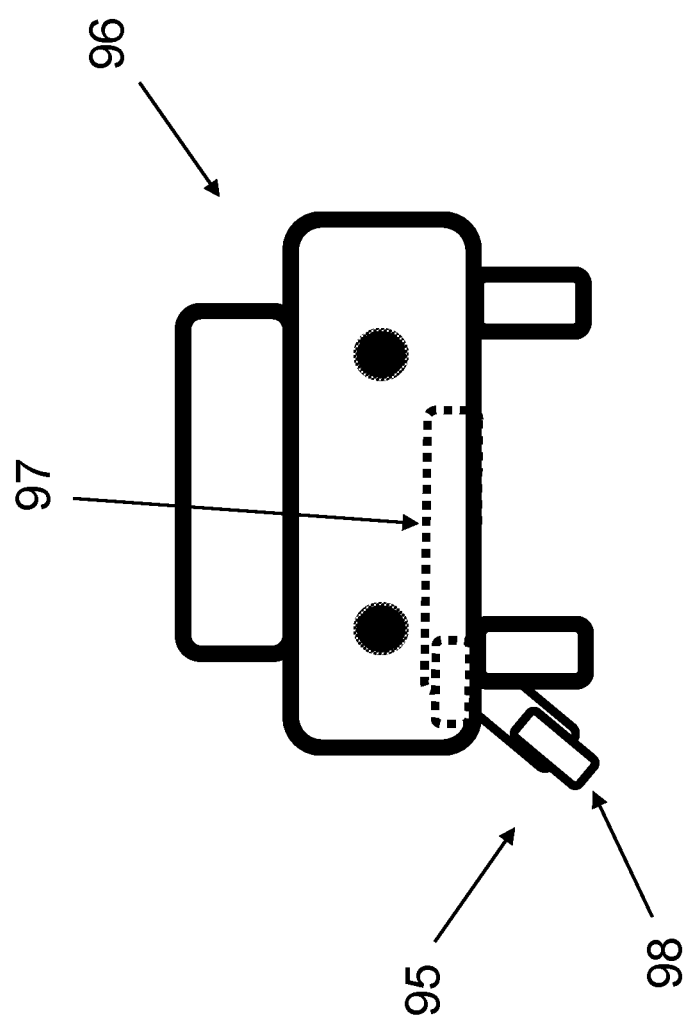
FIG. 14 illustrates the schematic of a deployable anti-rolling unit for vehicles and the like that is deployed in response to the vehicle roll-control sensory and deployment system.

The above embodiments are developed to provide deployable bumpers for front, back and sides of vehicles. It is, however, appreciated that similar deployment mechanisms may be used to deploy anti-rolling mechanisms to reduce the chances of a vehicle rolling in case of a sudden turn or tilt due to the road or tire conditions. Such anti-rolling mechanisms may be similarly deployed from the sides of the vehicle towards the ground level to generate a resisting torque to the rolling of the vehicle, such as shown schematically in FIG. 14. In this embodiment, at least one deployable anti-rolling unit 95 is provided on each side of the vehicle 96. In the schematic of FIG. 14 the deployable anti-rolling unit 95 is shown in its deployed position only on one side of the vehicle. The deployable anti-rolling unit 95 in its pre-deployment position is shown by dashed lines and indicated by the numeral 97 in FIG. 14. The deployable anti-rolling unit 95 can be provided with a freely rolling wheel 98 to minimize sliding friction during to vehicle motion with the deployed anti-rolling unit. It is appreciated that the vehicle has to be provided with a sensory system such as a gravity sensor which wound detect the possibility of roll and its direction and deploys the appropriate anti-rolling unit.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A system for protecting an automobile from a collision, the system comprising:
   a bumper having one or more bumper segments disposed on the automobile for absorbing at least some energy of the collision; and
   one or more actuators for deploying the bumper when conditions indicative of an impending collision is detected;
   wherein the one or more actuators are selected from a list comprising:
      one or more hydraulic actuators;
      one or more pneumatic actuators;
      one or more actuators actuated by one or more detonation charges;
      one or more fluid-filled bellows;
      one or more compressively pre-loaded springs; and
      one or more actuators connected to rotatable joints of links in a linkage;
      wherein the one or more actuators comprise two or more actuators and each of the two or more actuators are configured to be independently actuated.

2. The system of claim 1, wherein the two or more actuators are configured to be actuated at different lengths from the automobile.

3. The system of claim 1, further comprising a ratchet mechanism for allowing movement of the bumper to extend away from the automobile and to resist movement of the bumper towards the automobile after the bumper is deployed away from the automobile.

4. The system of claim 3, wherein the ratchet mechanism comprises a plurality of protrusions angled such that they allow movement of the bumper to extend away from the automobile and they resist movement of the bumper towards the automobile after the bumper is deployed away from the automobile.

5. The system of claim 4, wherein a length that the plurality of protrusions extend from a surface is variable.

6. The system of claim 3, wherein the ratchet mechanism comprises a clutch for allowing movement of the bumper to extend away from the automobile and the clutch being configured to resist movement of the bumper towards the automobile after the bumper is deployed away from the automobile.

7. A system for protecting an automobile from a collision, the system comprising:
   a bumper having one or more bumper segments disposed on the automobile for absorbing at least some energy of the collision; and
   one or more actuators for deploying the bumper when conditions indicative of an impending collision is detected;
   wherein the one or more actuators are selected from a list comprising:
      one or more hydraulic actuators;
      one or more pneumatic actuators;
      one or more actuators actuated by one or more detonation charges;
      one or more fluid-filled bellows;
      one or more compressively pre-loaded springs; and
   one or more actuators connected to rotatable joints of links in a linkage;
   wherein the one or more actuators comprise two or more pairs of actuators, each of the two or more pair of actuators being deployable at a different angle relative to a direction of impact of the automobile with another object.

* * * * *